March 2, 1948.  E. J. LARSEN ET AL  2,437,101
LENGTH MEASURING APPARATUS IN COMBINATION WITH A TWISTING MACHINE
Filed July 23, 1942  2 Sheets-Sheet 1
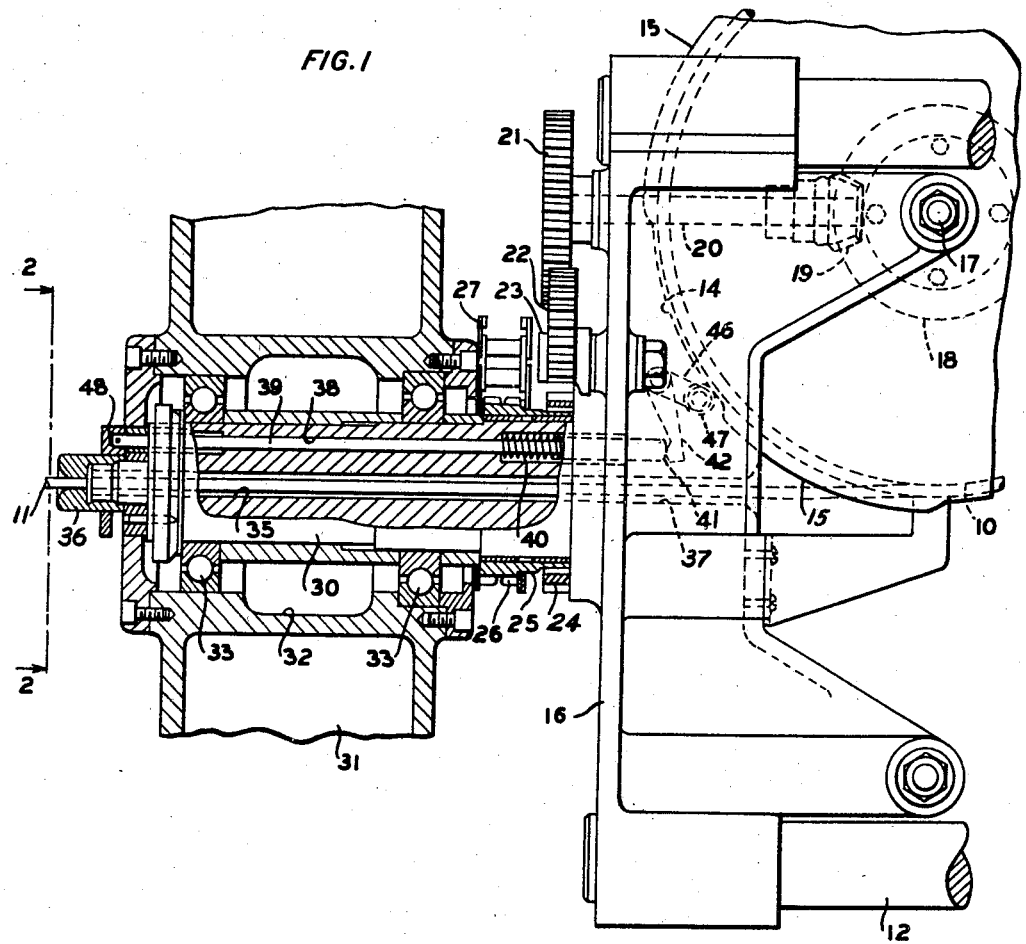
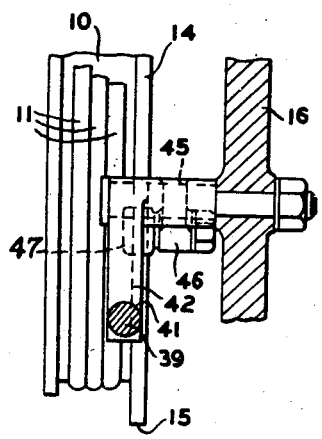
INVENTORS
E. J. LARSEN
O. G. NELSON
BY
E. R. Nowlan
ATTORNEY March 2, 1948.　　E. J. LARSEN ET AL　　2,437,101
LENGTH MEASURING APPARATUS IN COMBINATION WITH A TWISTING MACHINE
Filed July 23, 1942　　2 Sheets-Sheet 2
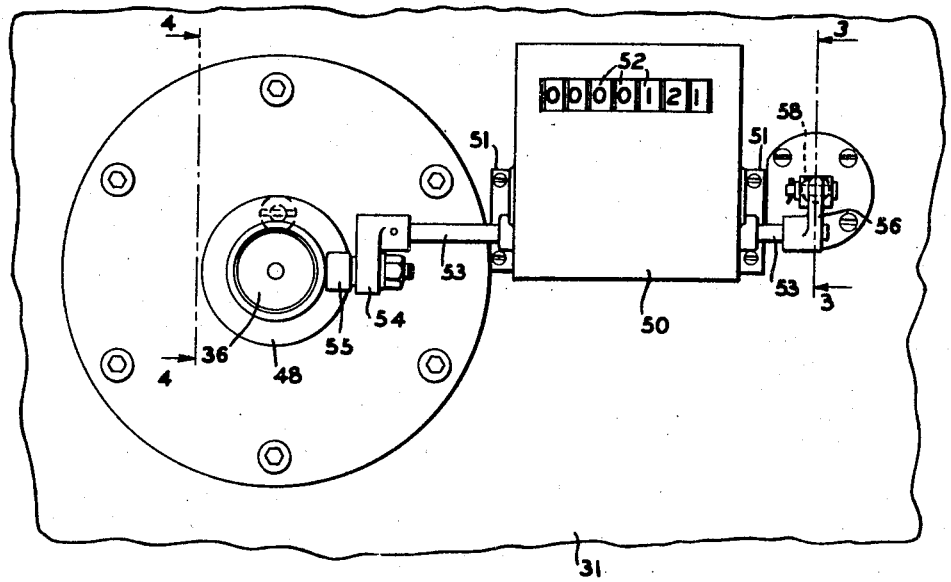
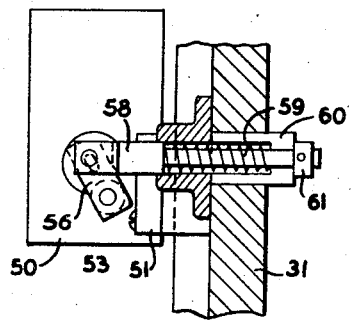
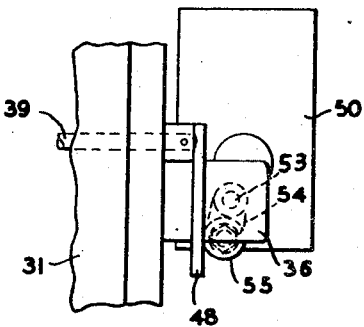
INVENTORS
E. J. LARSEN
O. G. NELSON
BY
E. R. Nowlan
ATTORNEY Patented Mar. 2, 1948

2,437,101

UNITED STATES PATENT OFFICE 2,437,101

LENGTH MEASURING APPARATUS IN COMBINATION WITH A TWISTING MACHINE

Elmer J. Larsen and Oscar G. Nelson, Baltimore, Md., assignors to Western Electric Company, Incorporated, New York, N. Y., a corporation of New York Application July 23, 1942, Serial No. 452,028

7 Claims. (Cl. 33—129)

This invention relates to length measuring apparatus, and more particularly to apparatus for measuring lengths of cable formed in a cable forming machine.

The conventional types of counters employing rollers rotated by advancing materials are commonly used in measuring materials that are advanced in straight paths, but when the materials are moved in different paths and when materials such as strands or conductors are intertwisted to form a cable, it is difficult and ofttimes impossible to measure such materials accurately.

An object of the invention is to provide a measuring apparatus particularly adapted to stranding machines for measuring the material resulting from the operation thereof.

In view of this and other objects, the invention comprises a measuring apparatus in combination with a material handling machine including a material advancing element, a counter unit, and mechanism controlled by the actuation of the advancing element to actuate the counter unit to accurately measure the material being advanced by the element.

Other objects and advantages will be apparent from the following detailed description when considered in conjunction with the accompanying drawings, wherein Fig. 1 is a fragmentary front elevational view of a material handling machine illustrating the invention;

Fig. 2 is a front elevational view of a portion of the structure shown in Fig. 1, this portion being taken substantially along the line 2—2 of Fig. 1;

Fig. 3 is a fragmentary sectional view taken along the line 3—3 of Fig. 2;

Fig. 4 is a fragmentary side elevational view of the structure shown in Fig. 2, this view being taken substantially along the line 4—4 of Fig. 2, and Fig. 5 is a fragmentary detailed view of a portion of the counter operating mechanism.

To illustrate the invention, there is shown a portion of the cable forming machine shown in our copending application Serial No. 452,027, filed July 23, 1942, which became Patent No. 2,364,984, issued December 12, 1944. In that application two pairs of electrical conductors are separately intertwisted while being withdrawn from their supply reels by capstan 10, after which and during their continuous advancement in their twisted pair formation, these pairs are twisted together to form a cable 11. The cable 11, composed of the pairs of conductors, passes a desired number of times about the capstan 10 and is then directed to a takeup reel (not shown) upon which the cable is wound. The capstan 10 as well as the takeup reel (not shown) is disposed in a flier 12 which is rotated continuously during the operation of the machine, to cause the intertwisting of the pairs of conductors.

It is desirable in the present instance to measure the length of cable being formed. To accomplish this result, a cam 14 is formed integral with or secured to the capstan 10 and has equally spaced lobes 15 about its periphery. The number of lobes depends upon the diameter of the capstan. For example, let it be assumed that the capstan has a circumference measuring twenty-four inches and that there are four lobes 15 on the cam each representing a length of six inches of the cable passing around the capstan.

Attention is now directed to the more specific structure of the machine and apparatus. The flier 12 includes a head 16 which rotatably supports the capstan and cam at 17, a bevelled gear 18 being mounted upon the cam. Another bevelled gear 19 interengages the gear 18 and is mounted for rotation with a shaft 20, the latter being rotatably supported in suitable bearings of the head 16. A gear 21 is mounted upon the outer end of the shaft 20 and interengages a gear 22 mounted upon a stub shaft 23 which is supported by the head 16. The gear 22 interengages a ring gear 24, the latter being mounted upon a hollow shaft 25 of which a sprocket 26 is a part. The sprocket 26 is driven through a chain 27 from any suitable means (not shown).

The shaft 25 is mounted for rotation on a shaft 30, the latter being an integral part of or secured to the head 16 of the flier 12. A stationary support 31, having a hollow portion 32, is provided with bearings 33 to rotatably support the shaft 30 and serve in rotatably supporting the flier 12. Other suitable means (not shown) may be provided at the opposite end of the flier to rotatably support it and cause its rotation in a desired direction.

The shaft 30 is centrally apertured at 35 and communicates with a polishing head 36 at the left end thereof and a passageway 37 at the right end thereof for the travel of the conductors, forming the cable 11, to the capstan 10. Another longitudinal aperture 38 is provided in the shaft 30 to slidably receive a push rod 39 and a spring 40 adapted to normally urge the push rod to the right and cause its outer end 41 to engage an actuating arm 42. The arm 42 is of the contour shown in Figs. 1 and 5 and is mounted for rotation on a shaft 45. The shaft 45 is supported by the head 16 as illustrated in Fig. 5. Integral with the arm 42 and extending angularly with respect thereto from the shaft, is a cam lever 46 which supports a cam roller 47 at a position to ride upon the periphery of the cam 14. The force of the spring 40 in urging the rod 39 to the right (Fig. 1) forces the cam roller 47 to ride upon the cam and be actuated thereby.

Attention is now directed to the other end of the rod 39 upon the outer end of which a control element or disc 48 is mounted. The disc 48 is annular in general contour, as shown in Fig. 2, and disposed concentric with the polishing head 36 for movement axially thereof.

Attention is now directed to Figs. 2, 3 and 4, wherein a counter unit 50 is mounted upon the support 31 as indicated at 51, this unit being of the conventional type and having registering discs or counter members 52 actuable through oscillation of its shaft 53. In the present instance let it be assumed that for each oscillating cycle of the shaft 53, the counter unit will register six inches and for each two cycles one foot will be indicated on the indicating elements. The shaft 53, as shown, extends completely through the unit and has a lever 54 mounted upon one end thereof with a roller 55 positioned to ride upon the element 48 during its rotation with the flier. Another lever 56 is mounted upon the opposite end of the shaft 53 and is connected to a spring actuated rod 58 as shown in Fig. 3, a spring 59 of this structure normally urging the shaft 53 counterclockwise (Fig. 3) to hold the roller 55 in engagement with the element 48. The rod 58 and the spring 59 are disposed in a housing 60, a collar 61 mounted upon the free end of the rod serving to limit the movement of the rod in one direction.

Upon considering the operation of the apparatus, let it be assumed that the flier 12 is continuously rotated in a given direction about the axis of the shaft 30, the capstan 10 and the cam 14 travelling in this circuitous path with the flier. During the operation of the flier, the capstan is driven in a counterclockwise direction through the chain 27, shaft 25, gears 24, 22 and 21, shaft 23 and gears 19 and 18. Therefore, during the rotation of the capstan, the material or cable 11 is advanced at constant rate of speed. The circumference of the capstan being known and the spacing of the lobes 15 of the cam being in proportion to the measurement of the capstan, each revolution of the capstan will advance a known length of material or cable.

In the present illustration in Fig. 1, the roller 47 is riding upon one of the low portions of the cam. When the next adjacent lobe 15 reaches the roller 47, the lever 46 will be moved clockwise, moving with it the arm 42 to move the rod 39 against the force of the spring 40 and move the element 48 outwardly. This movement of the element transmits movement to the shaft 53 of the counter unit 50 through roller 55 and the lever 54 against the force of the spring 59. During this movement of the shaft 53, the counter 50 will be operated to register the measured length of the cable. Each lobe 15 of the cam 14 is of sufficient length for the actuation of the mechanism extending to the counter to actuate the counter. As the roller 47 leaves a lobe of the cam, the actuating mechanism associated therewith including the rod 39, the element 48 and the shaft 53 will be allowed to return to normal or inoperative position through the control of the springs 40 and 59. This operation is repeated at definite intervals during the operation of the machine, to accurately measure the material or cable.

It will thus be apparent that the measuring apparatus is adapted for use in combination with a material advancing machine, wherein the material is moved not only longitudinally but in other directions to operate a counter unit which is remotely positioned on a stationary member and operated through a mechanism extending to the moving parts of the machine.

Although specific improvements of the invention have been shown and described, it will be understood that they are but illustrative and that various modifications may be made therein without departing from the scope and spirit of this invention as defined by the appended claims.

What is claimed is:

1. A measuring apparatus in combination with a twisting machine having a rotatable flier to twist advancing material and a member carried by the flier to advance the material, the measuring apparatus comprising a counter unit to register the length of the twisted material, the unit being mounted externally of the flier, a mechanism extending between the counter unit and a position within the flier and actuable to actuate the counter, and means movable with the flier and the material advancing member to actuate the mechanism.

2. A measuring apparatus in combination with a twisting machine having a rotatable flier to twist advancing material and a rotatable member in the flier to advance the material, the measuring apparatus comprising a counter unit to register the length of the twisted material passing over the rotatable member, the unit being mounted externally of the flier, a mechanism extending between the counter unit and a position within the flier and actuable to actuate the counter, and means mounted for rotation with the member and flier to actuate the mechanism.

3. A measuring apparatus in combination with a twisting machine having a rotatable flier to twist advancing material and a rotatable member in the flier to advance the material, the measuring apparatus comprising a counter unit to register the length of the twisted material mounted externally of the flier, a mechanism extending between the counter unit and a position within the flier and actuable to actuate the counter, and a cam rotatable with the member in the flier to actuate the mechanism.

4. A measuring apparatus in combination with a twisting machine having a flier to twist advancing material, a hollow shaft to rotatably support the flier and a rotatable member in the flier to advance the material, which comprises a counter unit to register the length of the twisted material, the counter unit being mounted externally of the flier, an element in the flier movable with the material, and mechanism extending from the counter unit, through the said shaft and into the flier for actuation by the element to actuate the counter unit.

5. A measuring apparatus in combination with a twisting machine having a flier to twist advancing material, a hollow shaft to rotatably support the flier and a rotatable member in the flier to advance the material, which comprises a counter unit to register the length of the twisted material mounted externally of the flier, a cam rotatable by and with the member in the flier, and mechanism extending from the counter unit, through the said shaft and into the flier for actuation by the cam to actuate the counter unit.

6. A measuring apparatus in combination with a twisting machine having a flier to twist advancing material, a hollow shaft to rotatably support the flier and a rotatable member in the flier to advance the material, which comprises a counter unit to register the length of the twisted material mounted externally of the flier, a mechanism extending from the counter unit, through the said shaft and into the flier, and a cam rotatable with the member in the flier and having spaced lobes adapted to actuate the mechanism to actuate the counter unit after each given length of material has been advanced by the member.

7. A measuring apparatus in combination with a machine having a unit mounted for rotation about a given axis for forming materials and including a capstan disposed in the unit for rotation therewith and mounted for rotation about an axis disposed at an angle with respect to the said given axis and means to rotate the capstan to advance a material, the measuring apparatus comprising a counter unit mounted at a remote position with respect to the rotatable unit to register the length of the material, a mechanism extending between the counter unit and the capstan and actuable to actuate the counter, and means rotatable with the capstan to actuate the mechanism.

ELMER J. LARSEN.
OSCAR G. NELSON.

REFERENCES CITED

The following references are of record in the file of this patent:

UNITED STATES PATENTS

| Number | Name | Date |
|---|---|---|
| 77,305 | McIntire | Apr. 28, 1868 |
| 1,436,648 | Chamberlin | Nov. 28, 1922 |
| 1,478,910 | Perkins | Dec. 25, 1923 |
| 1,585,660 | Frampton | May 25, 1926 |
| 2,209,584 | Somerville | July 30, 1940 |
| 2,315,747 | Terry et al. | Apr. 6, 1943 |